FIG. 1
FIG. 2
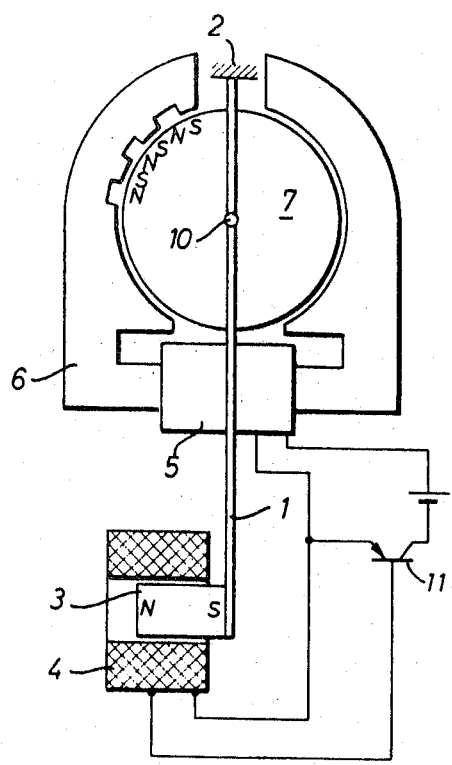
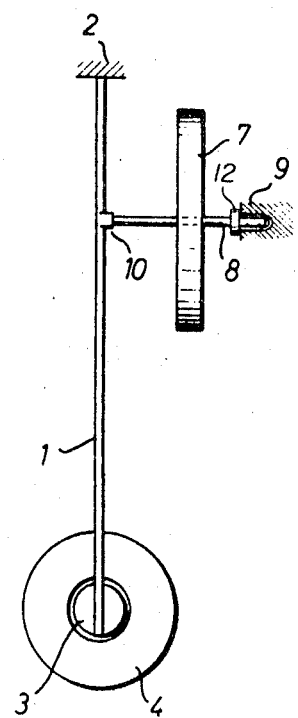

United States Patent Office 3,470,433
Patented Sept. 30, 1969

3,470,433
CONSTANT SPEED CLOCK MOTOR
Roland Siefert, Bad Durrheim, Germany, assignor to Kienzle Uhrenfabriken G.m.b.H., Schwenningen am Neckar, Germany, a limited-liability company of Germany
Filed Aug. 12, 1966, Ser. No. 572,145
Claims priority, application Germany, Aug. 12, 1965, K 56,868
Int. Cl. H02k 29/02, 29/04
U.S. Cl. 318—138       6 Claims

ABSTRACT OF THE DISCLOSURE

An electrically driven clockwork motor whose stator drive winding is controlled through a transistor relay as a switch and the relay is in turn controlled by output from an inductor coil. Cooperating with the inductor coil is an oscillatory permanent magnet on a spring the latter also carrying a bearing of the rotor of the motor.

---

This invention relates to an electrical timekeeping instrument with a mechanical oscillatory system in the form of a flexible vibrator and a fixed rotary motor.

There are transistor motors known in which a polarized disc cooperates with drive and exciter coils which are interconnected by a transistor switch. The speed of such motors is determined by a leaf spring having a permanent magnet at its free end arranged tangentially to a polarized disc. By alternate magnetic action between the polarized disc and the permanent magnet on the leaf spring the oscillation is controlled and stabilized approximately and so is the motor speed.

This known arrangement has the drawback in that a sufficient stabilization of the motor speed for an effective time piece is not attained. Particularly, the motor may race at a multiple of the normal or intended speed. From great inflow of current there arise shocks or recoils and torque fluctuations, in particular if for example when the pointer hand is not balanced.

In another known motor there are two polarized discs connected together by an elastic shaft. One of the discs cooperates with a stator having an exciter winding and the other with a stator having a drive winding and the two windings are interconnected by means of a transistor relay or switch. Among the drawbacks of such a motor are, first, the relatively expensive construction and the difficulty in mounting the polarized discs on the elastic shaft or arbor. Besides this the stators must be adjusted with respect to each other and the discs with utmost precision in accordance with the torque angle between forces of the stators on the discs. Racing of the motor can be prevented only by use of electronic switching. The known construction does not solve the problem of the mechanical output and drift which strongly influence the motor speed. A regulation of such a motor speed in a timepiece is possible only with great complications.

The present invention overcomes these drawbacks by the use of a motor provided with a mechanically oscillatory system in the form of a flexible oscillator, for example a vibrator, and a substantially fixed rotory motor driven by the magnetic field of a drive or work winding and wherein the mechanically oscillatory system is mechanically coupled to the rotor by means of a shaft bearing. The rotor shaft bearing is suitably located in the vicinity of a node of oscillation or a clamped portion of the oscillator.

The control of the drive or work circuit of the electronic relay, preferably a transistor relay, can, for example, be accomplished by means of a piezoelectric crystal, or by a control or exciter winding inductively acted upon. In the first instance the control coil can cooperate either with the rotor or with a permanent magnet mounted on the oscillator but the latter arrangement is to be preferred, since by it racing of the motor is prevented with a considerable margin of safety.

By use of the invention it is assured that the motor operates with stable control frequency. The mechanically work driven train does not influence the speed and the take-off pinion is located on the arbor near the fixed rotor-arbor bearing. A regulation of the frequency of the mechanical oscillator can be provided by means of known simple devices on the flexible oscillator. Especially important is the easy self-starting which is obtained if the electronic relay is a triggered relay.

The fixed bearing of the rotor arbor is preferably a callote or cup-shaped bearing.

In the drawing:

FIG. 1 is a diagrammatic front elevation of the motor for a timekeeping instrument, and FIG. 2 is a side view of the motor, the stator being omitted for clarity.

A leaf spring 1 is clamped at its end to a rigid structure as at point 2 and carries at its opposite end a permanent magnet 3 dipping or floating in an exciter or control solenoid winding 4. In practice, the winding 4 feeds the signal current or E.M.F. to a transistor relay device or transistor switch 11 and the output from the relay is connected to a drive or work winding 5 on a stator 6. While the winding 5 is shown arranged on a stator the winding may be in the form of one or more air-core solenoids.

If an alternating current, or pulsating unidirectional current, flows through the winding 5, a driving rotating field is produced to act on the rotor 7. The rotor arbor 8 is journaled in a fixed bearing 9, preferably a callote or cup-shaped bearing. The other bearing 10 for the arbor is, to the contrary, on the flexible oscillator and slightly movable laterally in the plane of the arbor axis, and is preferably located on a portion of the leaf 1 in the vicinity of its fixed end 2.

In operation, when the output circuit including the electronic relay is closed, an impulse is exerted on the rotor due to the field produced by a momentary flow of current through the work winding 5. Since the arbor 8 is mechanically connected with the oscillator spring 1, the arbor becomes agitated, whereby control electrical potentials are induced in the control winding 4, which potentials appear strongly amplified at the work coil 5. The current through the coil 5 occurs then in cyclic beat of the oscillations of the oscillating leaf. A continuous agitation of the oscillator always takes place owing to the mechanical coupling between the rotor and the oscillator. Since the oscillator may always oscillate only at its natural frequency, a racing of the motor is not possible That is to say the motor quickly becomes stabilized at its rated speed. The gear train for the instrument is not critical and may be of conventional nature, but preferably includes a wheel 12 fast on the arbor near the fixed bearing 9.

The invention claimed is:

1. In an electrical timekeeping device powered by a continuously running rotary electric motor, the combination of a substantially fixed stator provided with a drive winding; a polarized rotor actuated by the field of the stator; a flexible mechanical oscillator having a portion laterally oscillatory with respect to the stator and having a fixed mounted part; switch means for selectively connecting a source of current to the drive winding in timed relationship to oscillatory movement of said portion, the rotor having an arbor carrying the rotor; and a bearing receiving the arbor and mechanically coupled to the oscillator for transmitting lateral motion of the bearing and the arbor therein to actuate said switch means.

2. In an instrument as claimed in claim 1, said bearing being mounted on the oscillator in the vicinity of but not at a nodal point of oscillation, including the stationary point of said part fixedly mounted, when the oscillator beats at natural frequency.

3. In an instrument as claimed in claim 2 and a second fixed bearing for said arbor and axially remote from the first mentioned bearing and in the form of a cup for permitting a variation in the direction of the axis of the arbor about a point in the cup when the oscillator moves the first mentioned bearing.

4. In an instrument as claimed in claim 1, said oscillator being a leaf spring vibrator.

5. In an instrument as claimed in claim 4, the switch means being an electronic switch and including an inductive exciter winding in the input for the electronic switch and a permanent magnet fast on the free end of the vibrator and movable in the exciter winding.

6. In an instrument as claimed in claim 3, and a train of wheels for a timekeeping instrument including a driven wheel fast on the arbor near the callote.

References Cited

UNITED STATES PATENTS

| | | | |
|---|---|---|---|
| 2,815,477 | 12/1957 | Dunn et al. | 318—341 |
| 2,852,725 | 9/1958 | Clifford | 310—25 XR |
| 3,250,066 | 5/1966 | Engelhardt et al. | 58—23 |

J D MILLER, Primary Examiner

D. F. DUGGAN, Assistant Examiner

U.S. Cl. X.R.

318—254, 330